Nov. 26, 1929. W. GEHRIG Re. 17,508

POWER STEERING APPARATUS
Filed Jan. 23, 1926
Original Filed Jan. 23, 1926 3 Sheets-Sheet 1

Inventor
Walter Gehrig
By William Chinton
Attorney

Nov. 26, 1929. W. GEHRIG Re. 17,508
POWER STEERING APPARATUS
Filed Jan. 23, 1926
Original Filed Jan. 23, 1926 3 Sheets-Sheet 2
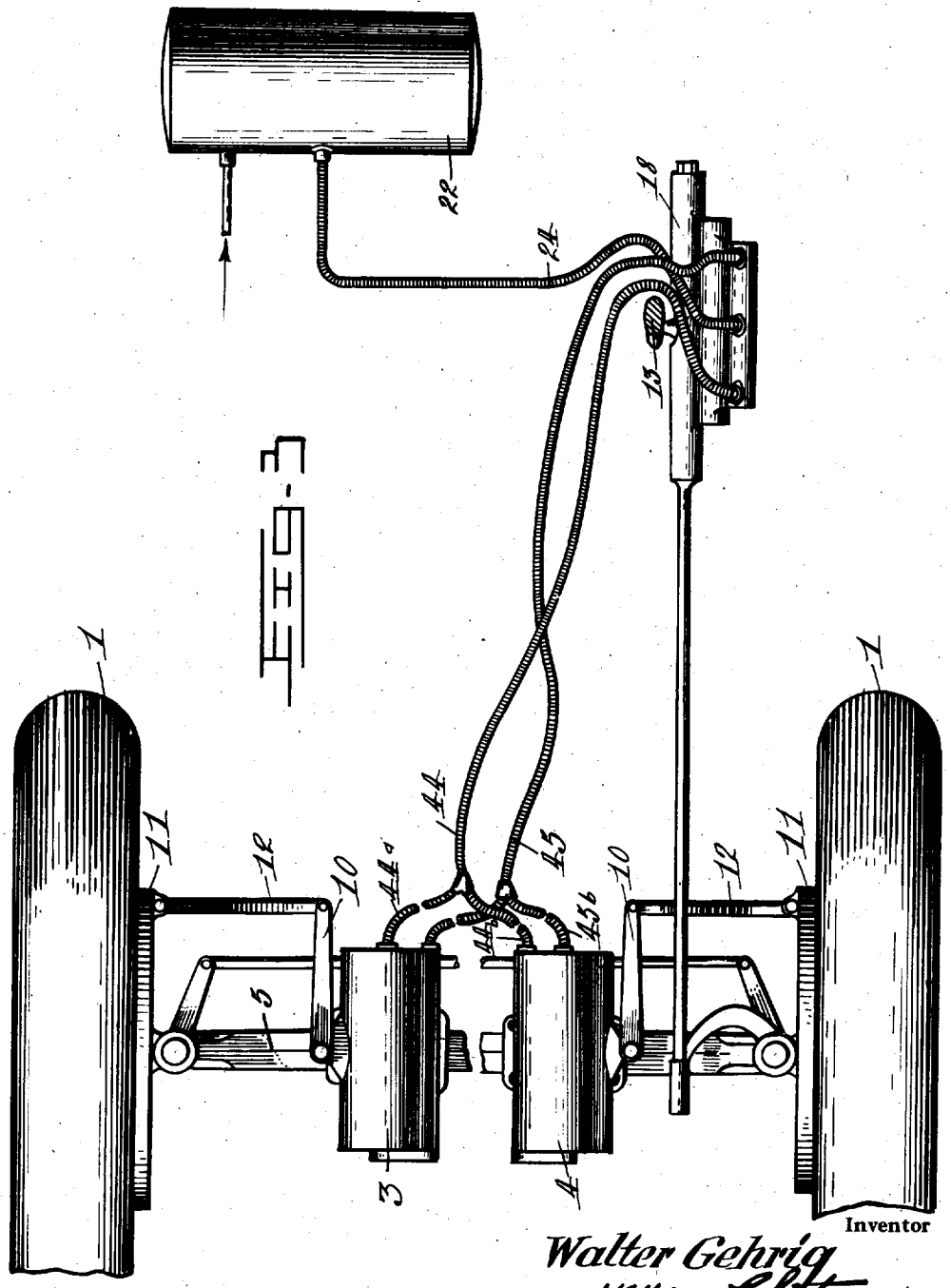
Inventor
Walter Gehrig
By William Ashton
Attorney Nov. 26, 1929. W. GEHRIG Re. 17,508

POWER STEERING APPARATUS
Filed Jan. 23, 1926
Original Filed Jan. 23, 1926 3 Sheets-Sheet 3

Inventor

Walter Gehrig

By William C. Pinto

Attorney

Reissued Nov. 26, 1929 Re. 17,508

UNITED STATES PATENT OFFICE

WALTER GEHRIG, OF DETROIT, MICHIGAN

POWER STEERING APPARATUS

Original No. 1,647,404, dated November 1, 1927, Serial No. 83,404, filed January 23, 1926. Application for reissue filed February 15, 1928. Serial No. 254,595.

The present invention pertains to a steering apparatus for vehicles and is applicable particularly to heavy automobile trucks, buses or other motor vehicles carrying balloon tires.

The principal object of the invention is to provide mechanical means for facilitating the steering of such vehicles. It has been found that motor vehicles equipped with the so called balloon tires are much more difficult to steer than vehicles carrying tires of smaller diameter and greater pressure, and a greater turning of the steering wheel is required for making the same size of turn. Another difficulty arising out of the use of balloon tires is that there is a greater tendency of the front wheels to wobble. Motor buses and trucks at present in use are so constructed that three to three and a half revolutions of the steering wheel are required for making the maximum turn. The driver of such a vehicle, in order to operate the same in this manner, is required to slow down in approaching an intersection in order to allow sufficient time to turn the steering wheel. In case of accident or an unforeseen obstacle, it is impossible for a heavy vehicle at high speed to be turned sharply to avoid danger.

The present invention overcomes the foregoing difficulties by providing an apparatus whereby a sharp turn may be quickly made without unreasonable exertion on the part of the driver. Even in the case of the large balloon tires, a vehicle equipped with the invention requires no more turning of the steering wheel than vehicles having smaller tires under greater pressure.

The invention consists essentially of double pistons mounted in cylinders and linked to the forward wheels of the vehicle, in combination with valve mechanism operable from the steering post for controlling a flow of pressure to the ends of the cylinders.

A further feature of the invention is that the double pistons are normally under balanced pressure in the cylinders, whereby wobbling of the front wheels or deflection on striking obstacles is substantially prevented.

The invention is fully disclosed in the following description and in the accompanying drawings, in which:

Figure 3 is a plan view of the device as applied to a vehicle;

Reference to these views will now be made by use of like characters which are employed to designate corresponding parts throughout.

Figure 1:
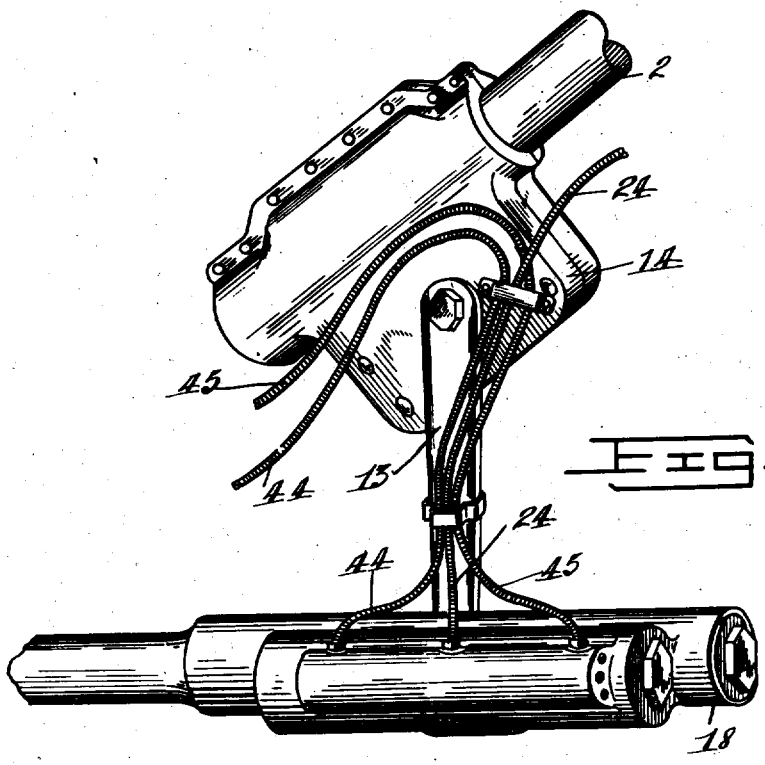
Figure 1 is a perspective view of the device applied to the steering post of a vehicle.
Figure 2:
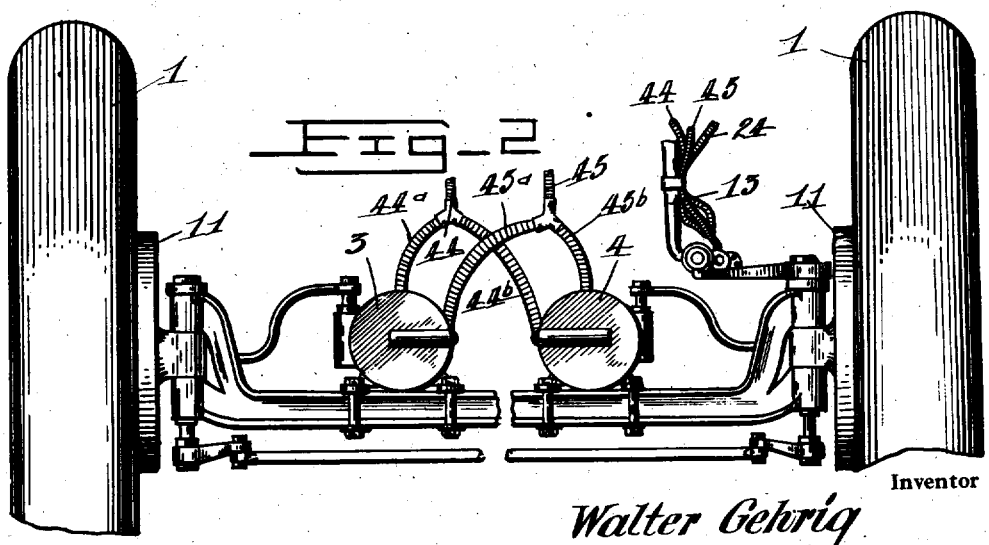
Figure 2 is a front elevation of a vehicle equipped with the invention.

The appliance constituting this invention is connected with the forward wheels 1 of the vehicle, or those wheels which are designed to be steered from the usual steering post 2. A pair of wheel control cylinders 3 and 4 are supported near the wheels 1, preferably on the axle. The cylinders contain double pistons $3^a$, $3^b$ and $4^a$, $4^b$ respectively, each pair being joined by a rod 6. To one piston of each pair is pivoted a finger 7 to which in turn is pivoted one end of a link 8, the remaining end of which is rigidly secured as at 9 to an arm 10 which is connected to the brake drum 11 by means of another link 12 connected pivotally to the members 10 and 11.

This mechanism is controlled, by the apparatus hereinafter described, from the steering post 2 which is connected by a worm and pinion (not shown) to an arm 13 pivotally mounted in a housing 14 clamped to the post 2. The lower end of the arm 13 carries a ball 15 which is received between two blocks 16 and 17 slidably mounted in a casing 18 supported at any convenient position. The two blocks 16 and 17 are pressed against the ball 15 by means of springs 19 bearing against these blocks and against the ends 20 of the cylinder 18. Stubs 21 secured in the ends 20 limit the outward movement of the blocks 16 and 17.

The numeral 22 designates the tank for containing the compressed air for the air brakes, and this tank is used also for operating the apparatus comprising this invention. Between the cylinder 18 and tank 22 is mounted an absorber tank 23, the centre of which is in communication with the tank 22 by means of a pipe 24. Valve seats 25 and 26 are formed at the ends of the tank and define valve chambers $25^a$ and $26^a$ which may communicate with the pipe 24 through the seats. These chambers contain the valves $25^b$ and $26^b$ having stems 27 slidably received in the bushing 28 disposed in the intermediate portion 29 of the cylinder. The valve heads are normally pressed towards their seats by springs 30 mounted in the compartments.

Between the absorber cylinder 23 and the cylinder 18 are mounted a pair of valve cylinders 31 and 32 which are associated with the blocks 16 and 17 in the manner hereinafter set forth. Although the several cylinders are illustrated as separated in Figure 5 for convenience of description, they may be actually embodied in a single casting as shown in Figure 1.

The valve cylinders contain partitions 33 and 34 dividing the cylinders into primary compartments $31^a$, $32^a$ and secondary compartments $31^b$ and $32^b$. Each primary compartment contains a valve 35 co-operating with a seat 36 and having a stem 37 pressed against an arm 38 by the pressure of a spring 39 bearing against the partitions 33 or 34. Said arm 38 is rigidly secured to the corresponding block 16 or 17.

Each secondary compartment contains also a valve 40 co-operating with a seat 41 and having a stem 42 separate from but adapted to engage the primary valve 35. The secondary valves are also normally pressed towards their seats by springs 43 engaging the outer ends of the cylinders 31 and 32.

The primary compartments $31^a$ and $32^a$ communicate from one side of their valve seats with the ends of the cylinder 23 through pipes 42 and 43. The secondary compartments at one side of the valve seat communicate with fluid supply pipes 44 and 45, the former being branched as at $44^a$ and $44^b$ to connect with one end of the cylinder 3 and the remaining end of the cylinder 4, while the other pipe is branched as at $45^a$ and $45^b$ to connect with the remaining ends of these cylinders. The primary cylinders, at the sides of their valve seats opposite the pipes 42 and 43, are connected through by-passes 46 and 47 into the lines 45 and 44 respectively. The secondary compartments, at the sides of their valve seats opposite the pipes 44 and 45, are formed with exhaust ports 48 and 49 respectively leading to the atmosphere.

Figures 4, 5:
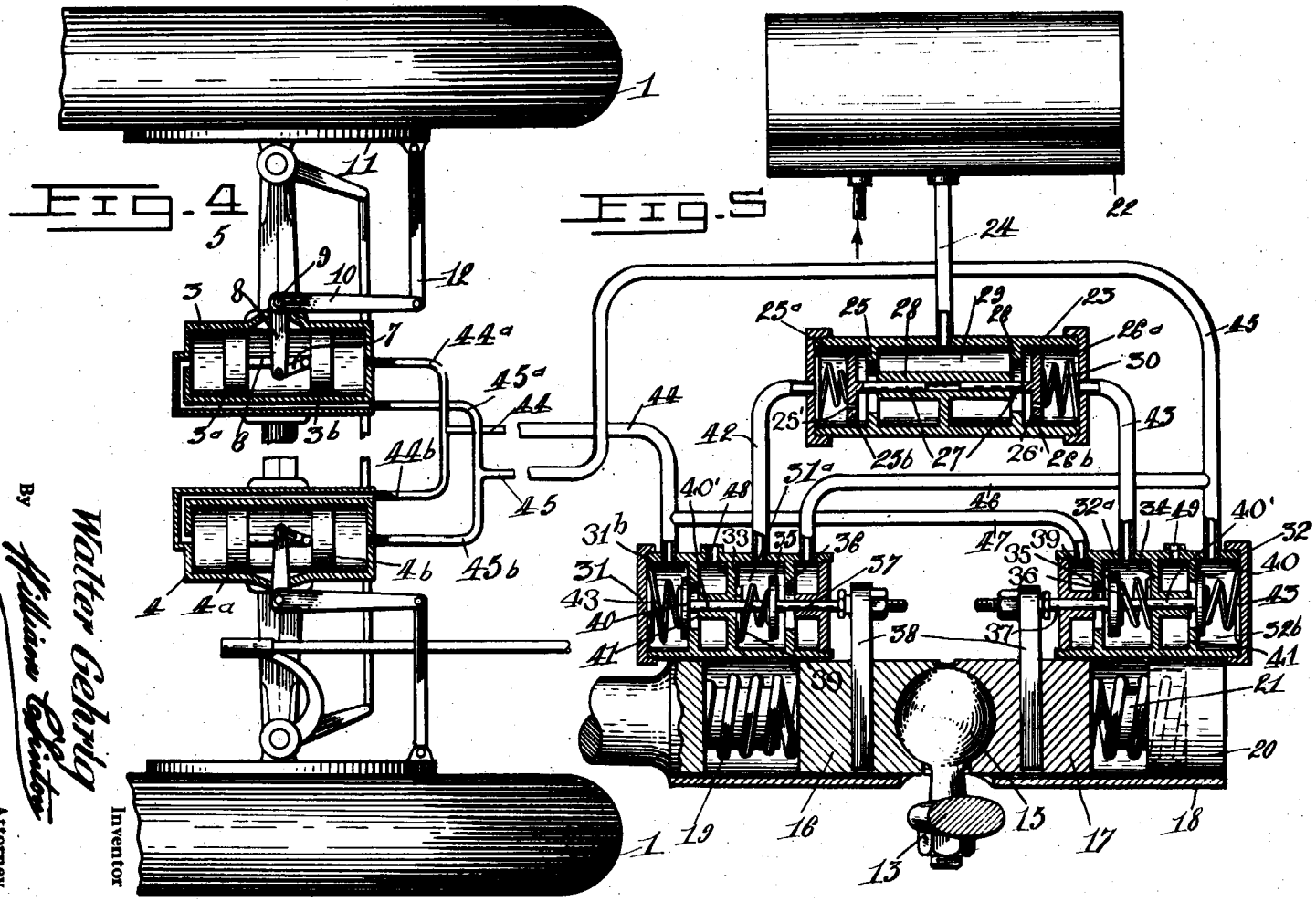
Figure 4 is a plan view of the forward part of a vehicle equipped with the invention, the wheel control cylinders being shown in section.
Figure 5 is a sectional view of the remaining part of the apparatus, parts being shown in elevation.

The apparatus is illustrated in Figures 4 and 5 with the parts in neutral position. The pressure from the tank 22 causes the valves $25^b$ and $26^b$ to uncover their respective seats, whereupon the pressure fluid flows through pipes 42 and 43 to the primary compartments. The valve seats 36 are held normally slightly open when the ball 15 exerts no considerable pressure against either one of the two blocks 16 or 17. From the compartment $31^a$ the pressure fluid flows through by-pass 46, pipe 45 and branches $45^a$ and $45^b$ to the forward end of cylinder 3 and the rear end of cylinder 4. From the primary compartment $32^a$, the pressure fluid flows through by-pass 47, pipe 44, branches $44^a$ and $44^b$ to the rear end of cylinder 3 and the forward end of cylinder 4. The equal pressures on both sides of the double pistons obviously causes no displacement of the pistons.

In the operation of the device, assuming that the vehicle is to be steered to the right, the driver turns the steering wheel in the usual manner. Ordinarily considerable force is required to turn the heavy wheels of a truck, and for a large turn several revolutions of the steering post are often necessary. The gearing placed within the housing 14 is constructed to swing the arm 13 to the right, with reference to Figures 1 and 5, when the steering wheel is turned to the right. The spring which presses the block 17 against the ball 15 will be compressed to a degree depending upon the resistance of the wheels 1 against the pressure from the manually operated steering gear (13). The two blocks 16 and 17 will therefore slide accordingly towards said compressed spring and the corresponding movement of the arms 38 will actuate the valves 35 and 40. The movement of the arms 38 causes the valve seat 36 in the cylinder 31 to be closed, and the flow of pressure through the pipe 46 to the forward end of cylinder 3 and rear end of cylinder 4 is obstructed. At the same time the primary valve in cylinder 32 is retracted and brought into engagement with the stem of the secondary valve, whereupon the secondary valve seat in the cylinder is opened. The compartment $32^b$ is thus brought into free communication with the exhaust port 49, and exhaust is permitted from the forward end of cylinder 3 and rear end of cylinder 4.

Pressure fluid is still supplied through pipe 43 to the primary compartment of cylinder 32 and continues to flow through by-pass 47, pipe 44 and branches $44^a$ and $44^b$ to the rear end of cylinder 3 and forward end of cylinder 4. This pressure serves to move the double pistons towards the ends in which the pressure has been relieved, whereupon the two wheels 1 are turned in unison through the linkages connecting them to the double pistons. Obviously a similar operation takes place when the vehicle is to be steered to the left.

From the foregoing description it will be understood that the pressure difference in the two chambers of each wheel control cylinder is constantly depending from the amount and the duration of opening of either one of the two exhaust valves 40. This opening of the exhaust valves in turn is constantly depending from the amount and the duration of compression of either one of the two springs 19. The pressure exerted on the wheels by the double pistons is therefore practically proportionate to the pressure exerted on the wheels by the manually operated steering rod 18 which connects the steering arm 13 with the wheels 1.

When one of the secondary valves 40 is open and releases the fluid pressure from the two cylinder chambers connected thereto, then the movement of the piston and the corresponding flow of fluid under pressure from the tank 22 to the opposed cylinder chambers will open the relative one-way valve ($25^b$ or $26^b$). This one-way valve will close again as soon as the pistons in the wheel control cylinders 3 and 4 are under balanced fluid pressure after the valves 35 and 40 have moved back to neutral positions.

Back pressure from the cylinder chambers 3 and 4 will not open the spring pressed one-way valves $25^b$ and $26^b$. Back flow of fluid from the cylinder chambers 3 and 4 and the fluid controlling device (35, $31^a$, $32^a$) is limited to the fluid being able to flow through the by-pass or apertures (25′ and 26′) associated with each one-way valve.

For very slow and minor steering adjustments which are not sufficient to compress the springs 19 so as to establish contact between the stems of the secondary valves and the heads of the primary valves, the apertures 25′ and 26′ in the valves $25^b$ and $26^b$ respectively diminish the resistance to the displacement of the double pistons.

Quick sidewise movements of the wheels, such as wheel-wobbling, however, will be dampened as the comparatively small apertures 25′ and 26′ in the one-way valves $25^b$ and $26^b$ do not permit free back flow of fluid from the cylinder ends which are diminished in size by the corresponding movement of the double pistons. Increased compression of the fluid must therefore occur in those cylinder chambers. This increased compression acts as resistance to wheel wobbling or to deflection of the wheels caused by irregularity in the road.

Should this increased compression not be sufficient to control the wheels, for example if one of the wheels is deflected by a rock or rut, then the valve mechanism is automatically thrown in action. The wheel movement will cause corresponding movement of the steering rod 18, the movement of which compresses either one of the springs 19 as the steering arm 13 is irreversible. Consequently the valves will be actuated in the same manner as if the manually operated steering gear would be actuated to counteract to said wheel deflection.

The extent of wheel movement which is not sufficient to throw the fluid pressure controlling valve mechanism in action is determined by the play or lost motion of the manually operated steering gear plus the clearance between the head of the primary valve 35 and the stem of the secondary valve 40.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent:—

1. In a power steering apparatus, the combination with a motive fluid supply and a fluid motor connected with the steered part, of a fluid controlling device comprising a pair of valve cylinders, partitions dividing each of said valve cylinders into a primary and secondary compartment, a valve in each primary compartment, operative connection between the primary valves and the manual operated steering mechanism, a secondary valve in each secondary compartment and engageable by the primary valve in the same valve cylinder, conduits connecting the primary compartments with the motive fluid supply, exhaust means associated with the secondary compartments, conduits in fluid connection with the fluid motor at one end and with the primary valve of one valve cylinder and the secondary valve of the other valve cylinder at the other ends.

2. In combination with the forward wheels of a vehicle, a wheel control cylinder containing pistons linked to said wheels, valve cylinders, partitions in said valve cylinders dividing the same into two compartments, a valve in each compartment, an operative connection between the valves in each cylinder and the steering mechanism of the vehicle, one of the compartments of each valve cylinder being in fluid communication with one of the ends of the control cylinder, and means for admitting pressure fluid into the remaining compartments.

3. In combination with the forward wheels of a vehicle, a wheel control cylinder containing pistons linked to said wheels, valve cylinders, partitions dividing each of said valve cylinders into a primary and secondary compartment, a primary valve in each primary compartment, an operative connection between the primary valves and the steering mechanism of the vehicle, conduits connecting the primary compartments with one end of the control cylinder, secondary valves in the secondary compartments, conduits connecting said secondary compartments with the remaining end of the control cylinder, said secondary valves being engageable by said primary valves, exhaust means associated with said secondary compartments, and means for supplying pressure fluid to said primary compartments.

4. In combination with the forward wheels of a vehicle, wheel control cylinders supported by the vehicle, pistons mounted in said cylinders and linked to the wheels, a pair of valve cylinders, partitions in said valve cylinders dividing the same into two compartments, a valve in each compartment, an operative connection between the valves and each cylinder and the steering mechanism of the vehicle, one of the compartments of each valve cylinder being in communication with one of the ends of each control cylinder, and means for admitting pressure fluid into the remaining compartments.

5. In combination with the forward wheels of a vehicle, a pair of wheel control cylinders supported by the vehicle, pistons mounted in said cylinders and linked to said wheels, a pair of valve cylinders, partitions dividing each of said valve cylinders into a primary and secondary compartment, a valve in each primary compartment, operative connection between the primary valves and the steering mechanism of the vehicle, conduits connecting the primary compartments with one end of each control cylinder, secondary valves in the secondary compartments, conduits connecting the secondary compartments with the remaining ends of the control cylinders, said secondary valves being engageable by said primary valves, exhaust means associated with said secondary compartments, and means for supplying pressure fluid to said primary compartments.

6. In combination with the forward wheels of a vehicle, a pair of wheel control cylinders supported by the vehicle, pistons mounted in said cylinders and linked to said wheels, a pair of valve cylinders, partitions dividing each of said valve cylinders into a primary and secondary compartment, a valve in each primary compartment, operative connection between the primary valves and the steering mechanism of the vehicle, conduits connecting the primary compartments with one end of each control cylinder, secondary valves in the secondary compartments, conduits connecting the secondary compartments with the remaining ends of the control cylinders, said secondary valves being engageable by said primary valves, exhaust means associated with said secondary compartments, an absorber cylinder having its ends connected to said primary compartments, spring pressed valves mounted in the ends of the absorber cylinder, each of said valves having an unobstructable port therethrough, and a pressure fluid tank connected to said absorber cylinder intermediate said valves.

7. In combination with the forward wheels of a vehicle, a wheel control cylinder containing pistons linked to said wheels, valve cylinders, partitions in said valve cylinders dividing the same into two compartments, a valve in each compartment, and yieldingly operative connection between the valves in each cylinder and the steering mechanism of the vehicle, one of the compartments of each valve cylinder being in fluid communication with one of the ends of the control cylinder and means for admitting pressure fluid into the remaining compartments.

8. In combination with the forward wheels of a vehicle, a pair of wheel control cylinders supported by the vehicle, pistons mounted in said cylinders and linked to said wheels, a pair of valve cylinders, partitions dividing each of said valve cylinders into a primary and secondary compartment, a valve in each primary compartment, operative connection between the primary valves and the steering mechanism of the vehicle, yielding pressure transmitting means interposed in said steering mechanism, conduits connecting the primary compartments with one end of each control cylinder, secondary valves in the secondary compartments, conduits connecting the secondary compartments with the remaining ends of the control cylinders, said secondary valves being engageable by said primary valves, exhaust means associated with said secondary compartments, and means for supplying pressure fluid to said primary compartments.

9. In a power steering apparatus, the combination with the motive fluid supply and the fluid controlling device for a fluid motor connected with the steered part, of a fluid conduit connecting the motive fluid supply with said fluid controlling device, a one-way valve in said conduit permitting flow of fluid from said fluid supply to said fluid controlling device but obstructing back flow of fluid from said fluid controlling device to said motive fluid supply, a by-pass associated with said one-way valve and in fluid connection with said fluid conduit on both sides of said one-way valve.

In testimony whereof, I have hereunto set my hand.

WALTER GEHRIG.